United States Patent
Barrat (10) Patent No.: US 11,697,309 B2
(45) Date of Patent: Jul. 11, 2023

(54) CROWN REINFORCEMENT FOR A TIRE OF A TRACTOR-TYPE AGRICULTURAL VEHICLE

(71) Applicant: COMPAGNIE GENERALE DES ETABLISSEMENTS MICHELIN, Clermont-Ferrand (FR)

(72) Inventor: Nicole Barrat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 399 days.

(21) Appl. No.: 16/755,691

(22) PCT Filed: Oct. 1, 2018

(86) PCT No.: PCT/FR2018/052402
§ 371 (c)(1),
(2) Date: Apr. 13, 2020

(87) PCT Pub. No.: WO2019/073143
PCT Pub. Date: Apr. 18, 2019

(65) Prior Publication Data
US 2020/0290404 A1  Sep. 17, 2020

(30) Foreign Application Priority Data
Oct. 13, 2017  (FR) .................................... 1759634

(51) Int. Cl.
*B60C 9/18*  (2006.01)
*B60C 9/20*  (2006.01)

(52) U.S. Cl.
CPC ............. *B60C 9/2003* (2013.01); *B60C 9/20* (2013.01); *B60C 2009/2016* (2013.01); *B60C 2009/2019* (2013.01); *B60C 2200/08* (2013.01)

(58) Field of Classification Search
CPC .......... B60C 2009/2045; B29D 30/242; B29D 30/16; B29D 30/1607; B29D 30/1621;
(Continued)

(56) References Cited

U.S. PATENT DOCUMENTS 3,736,972 A * 6/1973 Petraschek .............. B60C 19/00
152/549
9,637,844 B2  5/2017 Naoi et al.
(Continued)

FOREIGN PATENT DOCUMENTS

EP  2 689 939 A1  1/2014
EP  3 181 375 A1  6/2017
(Continued)

OTHER PUBLICATIONS

International Search Report dated Nov. 19, 2018, in corresponding PCT/FR2018/052402 (4 pages).

*Primary Examiner* — Kendra Ly
(74) *Attorney, Agent, or Firm* — Venable LLP (57) ABSTRACT

A tire (1) for an agricultural vehicle comprises a working reinforcement (2), radially on the inside of a tread (3) and radially on the outside of a carcass reinforcement (4), the working reinforcement (2) comprising a multilayer component made up of a radial stack of at least two working layers (21, 22), and aims to improve the endurance thereof. The working reinforcement (2) is made up of a circumferential spiral winding of at least one turn of the multilayer component, the first and second circumferential ends (211, 221; 212, 222) of each working layer (21, 22) are circumferentially offset from one another, and the respective first circumferential ends (211, 221) of two consecutive working layers (21, 22) are likewise circumferentially offset from one another.

13 Claims, 3 Drawing Sheets

(58) Field of Classification Search
CPC ............ B29D 30/1628; B29D 30/1642; B29D 30/165; B29D 30/1657; B29D 30/70; B29D 2030/088; B29D 2030/705
See application file for complete search history.

(56) References Cited

U.S. PATENT DOCUMENTS

| | | |
|---|---|---|
| 10,589,572 B2 | 3/2020 | Maruoka |
| 2014/0000779 A1 | 1/2014 | Naoi et al. |
| 2014/0158270 A1* | 6/2014 | Matsumoto ............ B60C 9/2009 152/526 |
| 2015/0007922 A1* | 1/2015 | Lardjane ............... B60C 9/0042 152/527 |
| 2017/0197470 A1 | 7/2017 | Maruoka |
| 2017/0246912 A1 | 8/2017 | Tashiro |

FOREIGN PATENT DOCUMENTS

| | | | |
|---|---|---|---|
| EP | 3 192 672 A1 | 7/2017 | |
| FR | 2 080 673 | 11/1971 | |
| WO | WO-0176892 A1 * | 10/2001 | ............. B29D 30/42 |

\* cited by examiner

CROWN REINFORCEMENT FOR A TIRE OF A TRACTOR-TYPE AGRICULTURAL VEHICLE

BACKGROUND

The present invention relates to a radial tyre, intended to be fitted to a heavy vehicle of agricultural type, and relates more particularly to the working reinforcement of such a tyre.

Such tyres for agricultural vehicles are intended to be mounted on 16- to 42-inch rims. Their dimensional specifications can be found in relevant standards, for example the ETRTO (European Tyre and Rim Technical Organisation) standard. Although not limited to this type of application, the invention is described more particularly for a radial tyre of large size, with a nominal section width of between 320 mm and 650 mm, and an outside diameter of the tyre inflated to its nominal pressure and mounted on its rim of between 822 mm and 1913 mm.

The tyre described in the invention is intended more particularly to equip a range of agricultural tractors, the power of which is between 80 CV and 200 CV. It follows that the load-bearing capacity of such a tyre varies from 975 to 4125 kilograms for a nominal inflation pressure of 160 kPa. Furthermore, this tyre should be able to achieve a speed of 65 km/h on the road.

Since a tyre has a geometry that exhibits symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The circumferential direction is tangential to the circumference of the tyre.

In the following text, the expressions "radially inner/radially on the inside" and "radially outer/radially on the outside" mean "closer to" and "further away from the axis of rotation of the tyre", respectively. "Axially inner/axially on the inside" and "axially outer/axially on the outside" mean "closer to" and "further away from the equatorial plane of the tyre", respectively, the equatorial plane of the tyre being the plane passing through the middle of the tread surface and perpendicular to the axis of rotation.

Generally, a tyre comprises a tread intended to come into contact with the ground via a tread surface, the two axial ends of which are connected via two sidewalls to two beads that provide the mechanical connection between the tyre and the rim on which it is intended to be mounted.

A radial tyre also comprises a reinforcement made up of a crown reinforcement radially on the inside of the tread and a carcass reinforcement radially on the inside of the crown reinforcement.

The carcass reinforcement of a radial tyre for this type of vehicle usually comprises at least one carcass layer comprising reinforcers coated in a polymeric material of the elastomer or elastomeric type known as a coating compound. A carcass layer comprises a main part that joins the two beads together and is generally wound, in each bead, from the inside of the tyre to the outside around a usually metal circumferential reinforcing element known as a bead wire so as to form a turn-up. The reinforcers of a carcass layer are substantially mutually parallel and form an angle of between 85° and 95° with the circumferential direction.

The crown reinforcement of a radial tyre for a heavy vehicle of agricultural type comprises a superposition of circumferentially extending crown layers radially on the outside of the carcass reinforcement. Each crown layer is made up of textile or metal reinforcers that are mutually parallel and coated in a polymeric material of the elastomer or coating compound type.

The working reinforcement, comprising at least two working layers, has the function of belting the tyre and conferring stiffness and road holding thereon. It absorbs both mechanical stresses of inflation, which are generated by the tyre inflation pressure and transmitted by the carcass reinforcement, and mechanical stresses caused by running, which are generated as the tyre runs over the ground and are transmitted by the tread. It is also intended to withstand oxidation and impacts and puncturing, by virtue of its intrinsic design and that of the protective reinforcement.

The working layers also have the function of giving the tyre high stiffness or drift thrust which, in a known manner, is necessary for achieving good road holding on the motor vehicle. Other performance aspects are also linked to the mechanical functioning of the working layers, for example the rolling resistance, the high-speed endurance or the breaking energy (breaking energy test).

In the field of tyres for agricultural vehicles, the reinforcers of the working layers can be of the metal type, such as steel, or of the textile type, such as polyester terephthalate (PET), polyamide, aramid, or rayon. The working layer is characterized by geometric and physical parameters that determine its mechanical behaviour. These parameters are, for example, the thickness of the working layer, which is directly linked to the diameter of the reinforcers, or the density of reinforcers in the layer, which is the number of reinforcers in a layer section with a width of 1 dm. The breaking strength of the reinforcer is used to dimension the working layer with regard to the mechanical loads experienced.

A person skilled in the art has to reach a technical and economical compromise in respect of the nature of the reinforcer, and the type of assembly thereof, in order to determine the optimal composite layer for the design of the tyre. In the following text, either the term reinforcers or the term cords will be used, depending on the context.

Textile cords made of polyester or polyamide exhibit temperature-sensitive behaviour, meaning that their mechanical properties change significantly with temperature. Standard contraction is the shrinkage undergone by a polyester or polyamide cord under a temperature of 180° C. under a standard tensile preload. There is a specific spinning process, known to a person skilled in the art, which makes it possible to obtain high modulus low shrinkage (HMLS) cords. The manufacture of a tyre passes through a curing phase at temperatures greater than 165° C. Therefore, it is necessary to control this parameter to limit the undesirable effects of the standard contraction of the reinforcers of the composite layers during the curing of the tyre.

A textile cord is characterized by:
The nature of the spun yarn (polyamide or nylon, aramid, polyester, rayon);
The titre (in tex), which is the weight in grams per thousand metres of this reinforcer;
The make-up assembly of the cord, which is the number of assembled strands;
The twist, which is the number of turns per metre for the strands and the folded yarns;
The standard contraction, which relates to the temperature-sensitive cords and which corresponds to the rate of shrinkage of the cord under standard loading conditions.

The physical and mechanical properties of a textile cord commonly used are the following:

The tenacity (values in cN/tex). It is evaluated by making the ratio of the breaking strength to the titre of the cord. This value makes it possible to compare the strength of different reinforcers by disregarding their size, and thus their titre;

The elastic modulus, which corresponds to the slope of the force-elongation curve depending on deformation, in its linear part at the foot of the curve. The endurance, evaluated by dynamic compression cycles, and linked to fatigue;

The standard contraction, which is linked to the deformation of the sidewalls, or the dimensional stability;

The adhesion, which translates to the capacity of the cord to stick to the coating elastomer.

The quality of the adhesion between the elastomeric coating compound and the textile reinforcer is determined by a test in which the force necessary to extract sections of cords from the vulcanized elastomeric coating compound is measured. This pull-out force is measured in newtons per cord pulled out.

The working reinforcement of a tyre for an agricultural vehicle is usually made up of working layers having textile reinforcers, requiring the presence of a plurality of working layers and generally more than two working layers, given the level of mechanical loading to which the tyre is subjected.

The use of working layers having metal reinforcers generally makes it possible to reduce the number of working layers necessary for taking up mechanical loads to two.

During the manufacture of the tyre, and in particular during the manufacture of the working reinforcement, each working layer is conventionally wound individually around a finishing drum, radially on the outside of the carcass reinforcement. The working layer is welded by overlapping, in that a first circumferential end of the working layer is superposed on a second circumferential end over a given length of overlap. However the large number of working layers having textile reinforcers results in local overthicknesses in the circumferential direction, corresponding to each of the welds. These overthicknesses have a detrimental effect not only on the uniformity of the tyre but also on its endurance. The impairment of the uniformity of the tyre manifests itself in the roadholding of the vehicle, which can prove dangerous. The welds result in local overthicknesses, which constitute points of mechanical weakness of the tyre.

The impairment of the circumferential uniformity of the tyre results from an irregular distribution of the mass of the tyre about the axis of rotation. More specifically, the uniformity can at least partially be characterized by an out-of-roundness criterion of the tyre. The out-of-roundness is the variation in the radius of the tyre in millimetres measured perpendicularly to the axis of rotation around the circumference, at the surface of the tread, without taking the influence of the grooves and other voids situated on the tread of the tyre into consideration. The peak-to-peak out-of-roundness corresponds, over a revolution of the wheel, to the difference between the maximum and minimum values of the out-of-roundness measured. The standard ISO 13326 defines the measurement principle for these uniformity criteria.

Endurance is evaluated using a running test of the tyre, which is inflated to its nominal pressure plus 1 bar, mounted on its nominal rim and compressed on a rolling road driven at a constant speed of rotation. The tyre undergoes loading cycles in stages, at levels of load that can range up to twice the maximum theoretical load thereof. The test is passed if the lifetime of the tyre is greater than a threshold time, expressed in hours and set in advance.

The inventors set themselves the objective of improving the endurance of a tyre for an agricultural vehicle, comprising a working reinforcement that is made up of at least two working layers.

SUMMARY

This objective was achieved by a tyre for an agricultural vehicle, comprising a working reinforcement, radially on the inside of a tread and radially on the outside of a carcass reinforcement:

the working reinforcement comprising a multilayer component made up of a radial stack of at least two working layers;

each working layer of the multilayer component extending circumferentially from a first circumferential end to a second circumferential end and being made up of reinforcers that are coated in an elastomeric compound, are mutually parallel and are oriented at an angle (A1, A2) relative to a circumferential direction (XX') tangential to the tread;

the working reinforcement being made up of a circumferential spiral winding of at least one turn of the multilayer component about the carcass reinforcement;

the first and second circumferential ends of each working layer being circumferentially offset from one another by an angle (B1, B2);

and the respective first circumferential ends of two consecutive working layers being circumferentially offset from one another by an angle C1.

BRIEF DESCRIPTION OF THE FIGURES

The invention will be better understood on reading the following description, given solely by way of non-limiting example and with reference to the drawings, in which.

DETAILED DESCRIPTION

The main idea of the invention is to do away with the welds of the working layers, which are the source of the lack of uniformity and of the mechanical particularities, by continuously winding, in a spiral, a multilayer stack around the carcass reinforcement. Furthermore, the ends of the working layers of the stack are circumferentially offset from one another, making it possible to distribute the mass of the working reinforcement more regularly around the circumference of the tyre and thus to obtain satisfactory uniformity, and consequently satisfactory endurance.

Two laying options are possible. The first laying option consists in feeding a cylindrical drum known as a finishing drum with a plurality of rollers that each contain a composite layer and, by way of a lamination process, simultaneously laying all the layers in a spiral. The second laying option consists, before the step known as the finishing step of the tyre, intended for laying the crown of the tyre radially on the outside of the carcass reinforcement, in separately preparing and then storing the multilayer stack, which is then laid in a spiral. In the particular case of a two-layer stack, three laying turns are therefore required to obtain a six-layer crown without any welds.

The first and second circumferential ends of each working layer of the multilayer component are circumferentially offset from one another by an angle (B1, B2).

The technical effect of this feature is that of avoiding the coincidence of the circumferential ends of the working layers in order to distribute the mechanical particularities in the circumferential direction. The circumferential end of a composite layer is actually characterized by zero stresses in the reinforcers, and significant deformations. Avoiding the superposition of circumferential ends makes it possible to avoid the concentration of significant deformations, which could bring about crack initiators.

The respective first circumferential ends of two consecutive working layers are circumferentially offset from one another by an angle C1.

The angle C1 represents the angular offset of the starting end of the first layer from the starting end of the second layer. The method for manufacturing the crown necessitates the cutting of the working layers at least at the start and end of laying. The working layer is cut at an angle D to the circumferential direction XX'. In the most general case, the cutting angle can be different from one working layer to another. The inventors found that the winding in a spiral around the carcass reinforcement has first of all to start with anchoring of the bevel that the circumferential end of the cut working layer forms, before starting to wind the next layer. In other words, the second layer is laid with a certain delay compared with the first layer. The value of the offset is a compromise, since it is necessary both to space apart the mechanical particularities due to the cutting of the working layer and at the same time to limit the size of the angular sector comprising one fewer working layer.

According to an advantageous embodiment of the invention, the first and second circumferential ends of each working layer of the multilayer component are circumferentially offset from one another, forming between one another, in an equatorial plane of the tyre, an angle at least equal to 38°.

The value of the angle between the circumferential starting and finishing ends of one and the same working layer is a development parameter of the invention which depends, in particular, on the laying radius of the multilayer component and on the number of turns selected. For a tyre size with a rim with a nominal diameter of 16 inches, and for a winding of three turns about the carcass reinforcement, the inventors found that a spacing between the starting and finishing ends corresponding to an angle of 38° allows proper operation of the invention.

According to another embodiment of the invention, the first and second circumferential ends of each working layer are circumferentially offset from one another, forming between one another, in an equatorial plane of the tyre, an identical angle for each working layer.

In a simplified embodiment of the invention, the offset of the start and finish of each layer could thus be identical.

According to the invention, the respective first circumferential ends of two consecutive working layers are circumferentially offset from one another by a distance at least equal to the product of the maximum axial width of the working layers multiplied by the cotangent of the cutting angle of said working layer.

The winding of the working layers should be carried out such that the starting ends of two consecutive working layers, radially in contact with one another, do not coincide either at the start or at the end of laying after the selected number of winding turns. The value of the offset of the two working layers is fixed during the development of the method. It depends on the cutting angle, and on the axial width of the working layers. Typically, for a size of standard designation 650/65 R38 157D, with the working layers cut at a cutting angle equal to 30°, the offset is at least 224 mm.

The value of the angle C1 depends on the cutting angle of the working layer, on the laying radius and on the width of the working layer. For the robustness of the solution, the inventors propose that the offset, measured as the distance in the circumferential direction, should be at least equal to the product of the cotangent of the cutting angle multiplied by the width of the working layer. The angle C1 is deduced simply through knowing the laying radius of the working layer.

Still according to the invention, the respective first circumferential ends of two consecutive working layers are circumferentially offset from one another, forming between one another, in an equatorial plane XZ of the tyre, an identical angle C1 for each pair of two consecutive working layers.

In this advantageous embodiment of the invention, the offset of the circumferential ends of the layers of the stack is constant. In fact, the multilayer component can be made up of more than two layers. Therefore, through ease of implementation, it is possible for there to be a constant offset between the circumferential ends of the layers, this not necessarily being regularly distributed.

The first and second circumferential ends of the set of working layers are regularly distributed circumferentially.

This embodiment is a particular case of constant offset. The circumferential ends of the layers of the stack are distributed in the circumferential direction in positions that are regularly distributed over a turn. If, for example, the stack contains p layers, the angle C1 is equal to $2*\pi/p$ ($\pi=3.1416$).

The first and second circumferential ends of the set of working layers form, with respect to the circumferential direction XX', an angle D at least equal to 30°.

In reality, the angle D corresponds to the cutting angle of the working layers at the start and end of laying. This oblique cut sections the reinforcers and the end of the working layer takes on a bevelled shape. At the start of laying, the spiral winding of each working layer begins with anchoring of the bevel formed by the cut. The oblique orientation of the cutting of the working layer with respect to the circumferential direction meets the need to avoid concentrating the ends of the reinforcers in one and the same meridian plane. At the ends of the reinforcers, the deformations of the elastomeric coating compound are at a maximum in terms of amplitude and can cause both cracking in the meridian plane, resulting in separation of the working layers in the axial direction, and also cracking in the circumferential direction along the reinforcers. For example, the section of the layer is oriented so as to make an angle of 30° with respect to the circumferential direction. For reasons of ease of implementation, the cutting angle of the working layers can be chosen to be parallel to the direction of the reinforcers.

The reinforcers of each working layer form an angle (A1, A2) at least equal to 10° and at most equal to 40° relative to the circumferential direction XX'.

The reinforcers of each working layer form an angle (A1, A2) relative to the circumferential direction XX' that is identical for each working layer.

The respective reinforcers of two consecutive working layers are crossed from one working layer to the next.

One of the advantages of the invention is that it can constitute a stack with layers having different mechanical properties. The angles that the reinforcers make with the circumferential direction are at least equal to 10° and at most equal to 40°, and they can be different from one layer to another. In a preferred embodiment, the angles are opposite from one layer to the next (crossed stack).

According to a preferred embodiment of the invention, the reinforcers of the working layers are made up of textile cords.

According to another embodiment of the invention, the reinforcers of working layers are metal cords made up of at least one steel thread.

A preferred embodiment of the invention is to have a spiral winding of a stack of composite layers reinforced with textile cords, but alternatively, such a stack can be realized in the same way regardless of the nature of the reinforcers, including with metal reinforcers.

Each working layer reinforced with textile reinforcers has a radial thickness at most equal to 1.5 mm.

The working layers with textile reinforcers have a radial thickness of about 1.5 mm, but, with metal reinforcers, which have a larger diameter, the thickness of the layer may be much greater.

The method for manufacturing the tyre comprises a step of circumferentially spirally winding the multilayer component that makes up the working reinforcement, radially on the outside of the carcass reinforcement.

According to a first embodiment variant of the invention, the method for manufacturing the tyre comprises a step of manufacturing the multilayer component by laminating the working layers upstream of the step of circumferentially spirally winding the multilayer component.

In this option, a first step consists in preparing the multilayer stack, which takes place upstream of the step of circumferentially spirally winding the multilayer component. The layers are cut to the desired length, then successively stacked, with the desired offsets being applied, and stored on a roller. A second step of this method consists in laying, by winding, the stack of working layers thus produced radially on the outside of the carcass reinforcement.

According to a second embodiment variant of the invention, the method for manufacturing the tyre comprises a step of manufacturing the multilayer component by laminating the working layers in a manner integrated with a step of circumferentially spirally winding the multilayer component.

In this option, the finishing assembly of the tyre is fed by a device comprising as many feed rollers as there are layers in the stack. Each layer is stored on a roller, and winding is effected onto the carcass reinforcement by lamination, with the feed rate of each roller being managed so as to produce the offsets of the layers.

Figure 1:
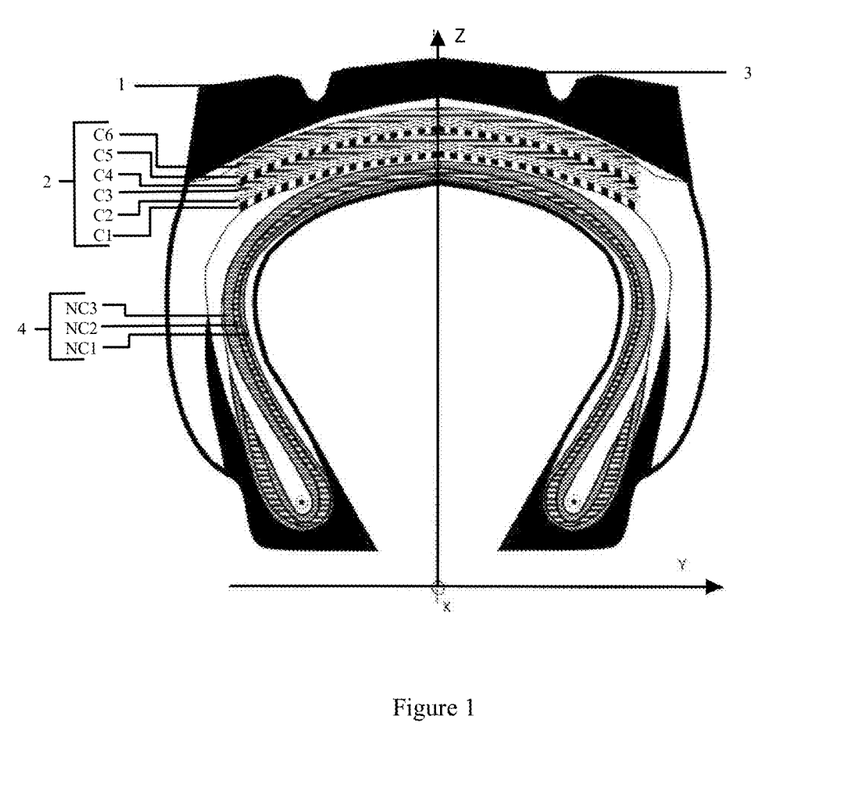
FIG. 1 depicts a meridian section through a tire according to the invention.
Figure 2:
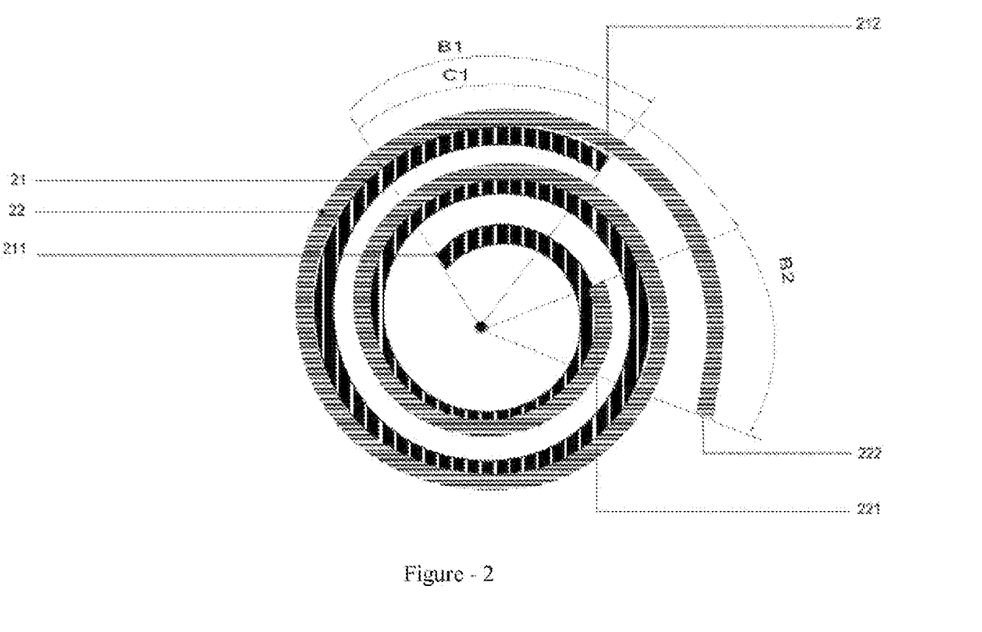
FIG. 2 is a circumferential cross section in the equatorial plane (XZ), showing the multilayer component formed of two working layers, before winding onto the carcass reinforcement.
Figure 3:
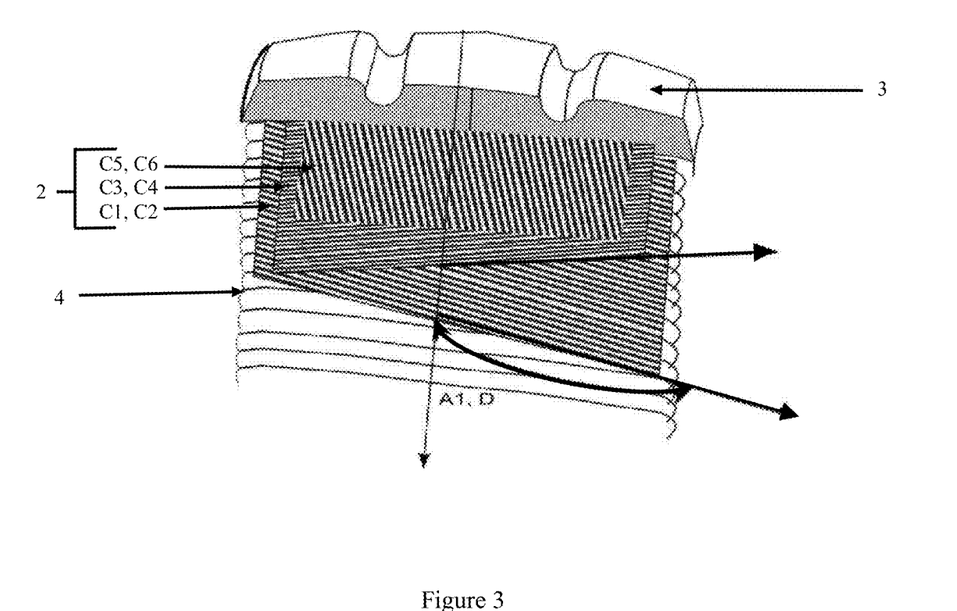
FIG. 3 shows a cutaway view of the crown of the tyre according to the invention.

The invention is illustrated in FIGS. 1 to 3, which are not shown to scale in order to make them easier to understand.

FIG. 1 depicts a meridian section through a tyre according to the invention, comprising:
A tread 1 that is intended to be in contact with the ground;
A working reinforcement 2 radially on the inside of the tread 1, made up of a stack of six working layers $C_1$ to $C_6$. Each working layer has its own mechanical properties such as the angle of the reinforcers with respect to the circumferential direction XX'. This stack of layers is obtained by spirally winding a multilayer component of working layers radially on the outside of the carcass reinforcement 4, comprising three radial carcass layers $NC_1$, $NC_2$, and $NC_3$.

FIG. 2 is a circumferential cross section in the equatorial plane (XZ), showing the multilayer component formed of two working layers, before winding onto the carcass reinforcement. In order to obtain the crown in FIG. 1, it is therefore necessary, during the phase of assembling the tyre, to effect a winding of three turns about the finishing drum:

The first, radially inner working layer 21 is delimited circumferentially by its starting end or first circumferential end 211, and its finishing end or second circumferential end 212. The angle B1 is formed between this starting end 211 and finishing end 212;

The second working layer 22 is laid with a circumferential offset radially on the outside of the first working layer, from its starting end or first circumferential end 221 to its finishing end or second circumferential end 222. The starting end 211 of the first working layer 21 and the starting end 221 of the second working layer 22 form an angle $C_1$ between one another. In the same way, the finishing end 212 of the first working layer 21 and the finishing end 222 of the second working layer 22 form an angle $C_2$ between one another.

FIG. 3 shows a cutaway view of the crown of the tyre, showing:
a tread 1 that is intended to be in contact with the ground;
a working reinforcement 2 having of a stack of six working layers $C_1$ to $C_6$.
In the case shown in FIG. 3, the working layers are grouped in pairs of the same length ($C_1$, $C_2$; $C_3$, $C_4$; $C_5$, $C_6$), and thus only three layers are shown;
a carcass reinforcement 4 having three carcass layers that are each oriented at an angle of 90° with respect to the circumferential direction (XX').

The invention was studied more particularly in the case of a radial tyre for an agricultural vehicle, of size 650/65 R38 157D. According to the ETRTO standard, this tyre can bear a load of index 157, which corresponds to a mass of 4125 kg, and can be subjected to a maximum speed of rating D, i.e. 65 km/h, for a nominal pressure of 160 kPa.

It is known that, simply on account of the radial profile of this tyre, pressurizing to 160 kPa generates distributed circumferential and meridian tensile forces. It is necessary to determine the reinforcers so as to take up these distributed tensile forces plus a safety factor.

The inventors examined the reinforcers defined in Table 1 below:

TABLE 1

|  | Reinforcer 1 | Reinforcer 2 | Reinforcer 3 | Reinforcer 4 |
|---|---|---|---|---|
| Designation | PET J144/2[1] | PET J220/2 | PET J334/2 | R244/3[2] |
| Titre (tex) | 144 | 220 | 334 | 244 |
| Assembly | 144/2 | 220/2 | 334/2 | 244/3 |
| Twist (t/m) | 290/290 | 240/240 | 270/270 | 330/330 |
| Helix angle (°) | 18.4 | 18.8 | 25.2 | 28.9 |
| Breaking strength (daN) | 18.5 | 28.5 | 40 | 28 |
| Standard contraction | 0.80% | 0.80% | 0.90% | / |
| Tenacity (cN/tex) | 60.3 | 57.9 | 53.3 | 35.2 |

TABLE 1-continued

|  | Rein-forcer 1 | Rein-forcer 2 | Rein-forcer 3 | Rein-forcer 4 |
|---|---|---|---|---|
| Elastic modulus (elongation at 7 daN) | 5.20% | 4.50% | 2.60% | 2.70% |
| Adhesion, pull-out force [3] N/thread | 76 | 86 | 92 | 105 |
| HMLS | yes | yes | yes | NA |
| Nature of the thread | Polyester | Polyester | Polyester | Rayon |

[1] the letter J indicates an HMLS (High Modulus Low Shrinkage) polyester terephthalate (PET) having a high modulus and low standard contraction;
[2] the letter R indicates a cord made of rayon.
[3] pull-out test as described in paragraph [0017].

The inventors have summarized, in Table 1, the physical characteristics and mechanical properties associated with four kinds of reinforcer. The first three examples of reinforcers are made of HMLS polyester with respective titres of 144 tex, 220 tex and 334 tex. The fourth example of a reinforcer is made of rayon with a titre of 244 tex. The first three examples of reinforcers are cords obtained by twisting two spun textile filaments, the twists of which in turns per metre are indicated in the table. The fourth reinforcer made of rayon is obtained by twisting three spun textile filaments of 334 tex, each with 330 turns per metre.

The inventors showed that, for proper operation of the invention, the tenacity of the polyester textile reinforcers needs to be greater than 60 cN/tex, and that the tenacity of the rayon reinforcers needs to be greater than or equal to 35 cN/tex. The textile cords need to be sufficiently strong to undergo all the steps of the method for manufacturing the tyre, in particular the shaping phases, during which they are subjected to significant deformation without being damaged.

The temperature-sensitive textile reinforcers made of PET exhibit a standard contraction of between 0.8% and 1%. The twists applied to the polyester spun yarns have an amplitude greater than 240 turns per metre and less than 270 turns per metre. The helix angle during the application of the twist about the axis of the spun yarn is less than or equal to 25.2° in terms of amplitude.

The reinforcers have adhesion properties that are reflected by results of the pull-out test of between 76 newtons per thread and 92 newtons per thread for the polyester cords; for rayon, the pull-out force is equal to 105 newtons per thread.

The secant moduli of the textile reinforcers at 7% deformation are in the range from 2.6 daN/mm² to 5.2 daN/mm².

The coating compounds are compositions of compounds as defined in Table 2 below:

TABLE 2

| Constituents | Per hundred rubber (phr) |
|---|---|
| Natural rubber | 40 |
| SBR Ref 1 (1) | 25 |
| SBR Ref 2 (2) | 35 |
| Carbon black N550 (3) | 60 |
| Oil (4) | 2 |
| Tackifying resin (5) | 5 |
| Zinc oxide | 3 |
| Stearic acid | 1.5 |
| Antioxidant 1 (6) | 1.5 |
| Antioxidant 2 (7) | 1 |
| Sulfur | 2 |
| Sulfenamide (8) | 0.5 |

(1): SBR Solution of Tg −48° C., % Styrene 27, % Vinyl 24, % Trans 46
(2): SBR Solution of Tg −54° C., % Styrene 26, % Vinyl 24, % Trans 47
(3): Carbon black N550
(4): Oil of MES type
(5): Tackifying resin of TAC OPF type
(6): Antioxidant of phenylenediamine type
(7): Antioxidant of acetone aniline (TMQ) type
(8): Sulfenamide of tert-butyl benzothiazolesulfenamide (TBBS)

Starting from the reinforcers and the coating compound described in Tables 1 and 2 above, the inventors defined the following working layers for studying the optimal combination for proper operation of the invention.

TABLE 3

| Examples | Nature[2] | Reinforcer[3] | Twist[4] | Total thickness | Density[1] | Tensile strength |
|---|---|---|---|---|---|---|
| Example 1 | J | J 220/2 | 240/240 | 1.4 mm | 87 t/dm | 24.8 daN/mm |
| Example 2 | J | J 144/2 | 290/290 | 0.97 mm | 104 t/dm | 19.2 daN/mm |
| Example 3 | J | J 144/2 | 290/290 | 0.97 mm | 90 t/dm | 16.6 daN/mm |
| Example 4 | R | R 244/3 | 330/330 | 1.25 mm | 79 t/dm | 31.6 daN/mm |
| Example 5 | J | J 334/2 | 270/270 | 1.44 mm | 74 t/dm | 20.7 daN/mm |

[1] The density is the number of threads per decimetre (t/dm)
[2] Nature of the reinforcers: J for HMLS PET and R for rayon
[3] Assembly of the strands to obtain cords. Example: J114/2 signifies a cord made up of the assembly of two strands of 144 tex each
[4] Torsion applied to the strands (in turns per metre) to obtain the cord The inventors used Example 1 to produce the working reinforcement of the tyre. This choice represents the best technical and economical compromise. The working reinforcement therefore comprises six working layers reinforced with textile PET reinforcers of the type J220/2. Each working layer has a density of 87 reinforcers per decimetre. The coating compound is the one described in Table 2.

The stack of six working layers is obtained by three turns of spiral winding of the multilayer component made up of two working layers, as shown in FIG. 2, radially on the outside of the carcass reinforcement.

The tests that make it possible to quantify the performance aspects of a tyre according to the invention relate to endurance and industrial production cost.

By taking as reference a conventionally manufactured tyre having six successively laid textile layers, each comprising a weld that spreads over an overlap length of 8 mm, the following results in Table 4 are obtained, with reference to a base 100 reference:

TABLE 4

| | Endurance (Running hours) | Industrial manufacturing cost |
|---|---|---|
| Working layers with welds (Reference) | 100 | 100 |
| Working layers without welds (Invention) | 131 | 91 |

The endurance result was obtained according to the test described above. The tyre of the invention has a more than 31% longer running life compared with the reference. Moreover, the novel spiral laying method has a cycle time reduced by 9% compared with the conventional method of laying layers with a weld for each layer.

The tyre of the invention exhibits better performance aspects than those of the reference tyre and therefore meets the initial objective of the inventors.

The invention has been described for a tyre for equipping agricultural vehicles, but it can also apply to any type of tyre.

The invention claimed is:

1. A tire for an agricultural vehicle, the tire comprising:
a tread;
a carcass reinforcement; and
a working reinforcement radially inside of the tread and radially outside of the carcass reinforcement, the working reinforcement comprising a multilayer component made up of a radial stack of at least two working layers, each working layer of the multilayer component extending circumferentially from a first circumferential end to a second circumferential end and being made up of reinforcers that (i) are coated in an elastomeric compound, (ii) are mutually parallel, and (iii) are oriented at an angle A relative to a circumferential direction tangential to the tread,
wherein the working reinforcement is made up of a circumferential spiral winding of at least one turn of the multilayer component about the carcass reinforcement, the first and second circumferential ends of each working layer of the multilayer component being circumferentially offset from one another by an angle B,
wherein the entirety of the respective first circumferential ends of two consecutive working layers of the multilayer component being circumferentially offset from one another by an angle C, and
wherein the first and second circumferential ends of the set of working layers are regularly distributed circumferentially.

2. The tire according to claim 1, wherein the first and second circumferential ends of each working layer of the multilayer component are circumferentially offset from one another by an angle B at least equal to 38°.

3. The tire according to claim 1, wherein the first and second circumferential ends of each working layer are circumferentially offset from one another by an identical angle B for each working layer.

4. The tire according to claim 1, wherein respective first circumferential ends of two consecutive working layers are circumferentially offset from one another by a distance at least equal to a product of a maximum axial width of the working layers multiplied by a cotangent of a cutting angle of the working layers.

5. The tire according to claim 1, wherein respective first circumferential ends of two consecutive working layers are circumferentially offset from one another by an identical angle C for each pair of two consecutive working layers.

6. The tire according to claim 1, wherein the first and second circumferential ends of the set of working layers form, with respect to the circumferential direction, an angle D at least equal to 30°.

7. The tire according to claim 1, wherein the reinforcers of each working layer form an angle A at least equal to 10° and at most equal to 40° relative to the circumferential direction.

8. The tire according to claim 1, wherein the reinforcers of each working layer form an identical angle A, relative to the circumferential direction, for each working layer.

9. The tire according to claim 1, wherein respective reinforcers of two consecutive working layers are crossed from one working layer to the next.

10. The tire according to claim 1, wherein the reinforcers of the working layers are made up of spun textile filaments.

11. The tire according to claim 1, wherein the reinforcers of the working layers are metal cords made up of at least one steel thread.

12. The tire according to claim 1, wherein each working layer, reinforced with textile reinforcers, has a radial thickness at most equal to 1.5 mm.

13. The tire according to claim 1, wherein the first and second circumferential ends of the set of working layers are regularly distributed circumferentially such that the angle C is equal to $2*\pi/p$, where p is the number of working layers.

* * * * *